Figure 1:
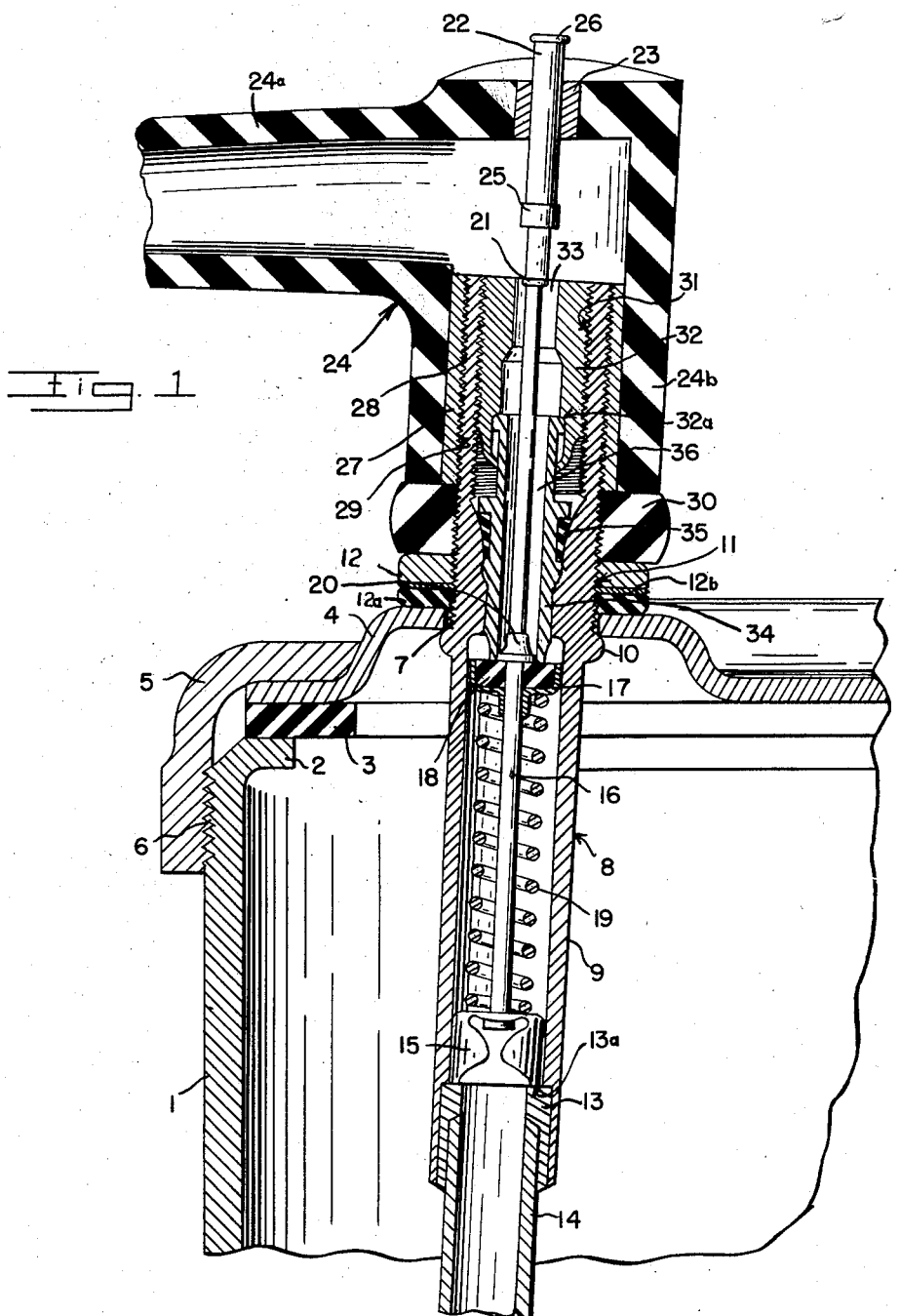

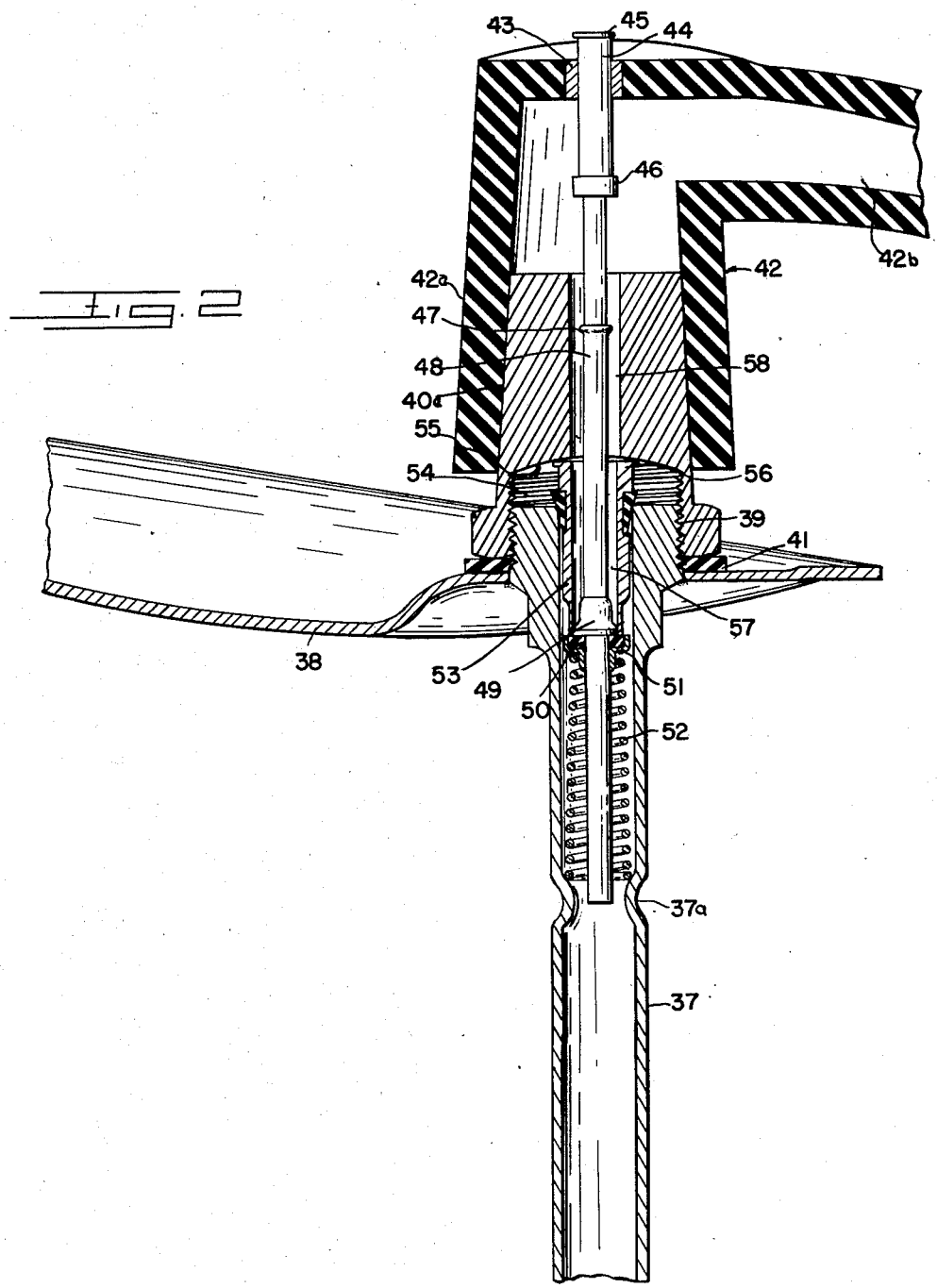

Aug. 21, 1951 A. H. SMITH 2,565,050
SANITARY DISCHARGE VALVE FOR CONTAINERS HOLDING EDIBLE
SUBSTANCES, SUCH AS WHIPPING CREAM, UNDER PRESSURE
Filed Aug. 11, 1949 2 Sheets-Sheet 2

INVENTOR
ALLYNE H. SMITH
By Toulmin & Toulmin
ATTORNEYS

Patented Aug. 21, 1951

2,565,050

UNITED STATES PATENT OFFICE 2,565,050

SANITARY DISCHARGE VALVE FOR CONTAINERS HOLDING EDIBLE SUBSTANCES, SUCH AS WHIPPING CREAM, UNDER PRESSURE

Allyne H. Smith, Columbus, Ohio, assignor to Aeration Processes, Inc., Columbus, Ohio, a corporation of Ohio Application August 11, 1949, Serial No. 109,706

9 Claims. (Cl. 222—518)

The present invention relates to valves, and more particularly, to discharge valves for discharging edible materials from containers and is a continuation-in-part application of my co-pending application, Serial No. 779,116, filed October 10, 1947, now abandoned.

It is well known to enclose edible materials such as whipping-cream in containers which have been charged with an inert gas under pressure, for instance, a nitrous gas, and to use the pressure of this gas for discharging the whipping-cream as whipped-cream. The principle of this method is, for instance, described in United States Patent No. 2,281,604 to A. H. Smith, dated May 5, 1942.

The valves heretofore used in connection with dispensing devices for edible material such as whipped-cream, have the drawback that they are relatively complicated and relatively difficult to clean.

It is, therefore, an object of this invention to provide a valve which will overcome the above-mentioned drawbacks.

It is also an object of this invention to provide a valve for use in connection with the dispensing of edible material such as whipped-cream, which will be substantially free from any thread or similar crevices in which the material to be dispensed can accumulate and thereby cause deterioration and spoilage of the product.

It is still another object of this invention to provide a valve of the type mentioned above, which can be easily cleaned, assembled, or removed from the container.

These and other objects and advantages of the invention will appear more clearly from the following specification in connection with the accompanying drawings, in which:

Figure 1 illustrates a section through a first embodiment of the invention, while Figure 2 represents another embodiment of the valve according to the present invention.

Referring now to the drawings in detail, and Figure 1 thereof in particular, the structure shown therein comprises a container 1 provided at the upper end thereof with a flange 2. Mounted on the flange 2 is a sealing ring 3 on which rests a lid 4. The lid 4 is clamped against the ring 3 by means of a screw-top 5 threadedly engaging a correspondingly threaded portion 6 of the container 1.

The lid 4 is provided with an opening 7 through which extends the valve unit proper, which is generally designated by the character 8. The valve unit 8 comprises a tube 9 provided with a bead-like flange 10 for engagement with the lid 4, and is also provided with an exterior thread 11 for engagement with a fastening nut 12. Interposed between the nut 12 and the lid 4, is a rubber washer 12a and a metal washer 12b. It will be noticed that tightening of the nut 12 securely clamps the valve unit to the lid 4. Connected to the tube 9 in any convenient manner, is an insert 13 which forms an inwardly extending flange 13a for a purpose to be described later. Connected to the insert 13, is a tube 14, which in a known manner, extends to the bottom of the container 1, preferably a depressed portion thereof, in order to make it possible to drain and discharge practically the last drop of the contents in said container.

Resting on the flange 13a is a spring holder 15 which is slidably connected to shaft 16 in any other convenient manner. The shaft 16 has braised or sweated thereto, a cup 17 which contains a gasket or sealing material such as the rubber material 18. The cup 17 is so shaped that its lower portion serves as seat for one end of the spring 19, while the other end of the spring 19 rests on the spring-holder 15. As will be clear from the drawing, the shaft 16 extends through the rubber material 18 and has connected thereto, a bell-shaped member 20 which engages with the bottom portion thereof, the rubber material 18. The upper end of the shaft 16 beyond the bell portion 20, is somewhat smaller in diameter than the lower portion of the shaft 16, and ends in a flanged portion 21. The flanged portion 21 is engaged by an actuating member 22 passing through a sleeve 23 mounted in and vulcanized to the discharge nozzle generally designated 24. In order to limit the inward and outward movement of the actuating member 22, the latter is provided with a lower flange 25 and an upper flange 26.

The nozzle 24 consists of a spout portion 24a and a neck portion 24b. The neck portion 24b has connected thereto, for instance by vulcanization, a sleeve 27 which has a threaded portion on its inside 28 engaging a correspondingly threaded portion 29 on the upper outside portion of the tube 9. The thread 29 is also engaged by a gasket 30 interposed between the nut 12 and the lower end of the neck portion 24b of the nozzle 24.

The upper portion of the tube 9 is furthermore provided with an inner thread 31 engaged by a correspondingly threaded portion of a thimble 32. The thimble 32 is provided with a bore 33 therethrough, which has a larger diameter than the upper portion of the shaft 16 so as to define a cylindrical passage for the material to be discharged. The thimble 32 is provided with a shoulder 32a which engages a sleeve 34 forming a first valve element. The sleeve 34 firmly rests on a gasket or sealing material 35 which is interposed between the sleeve 34 and an adjacent portion of the tube 9. As will be clear from the drawing, the thimble 32 when properly tightened, presses the sleeve 34 against the gasket 35 so that the sleeve 34 is securely and stationarily held within the tube 9. The arrangement is so that a proper sealing is effected by the gasket 35 between the sleeve 34 and the adjacent portion of the tube 9. The gasket 35 is preferably vulcanized to the sleeve 12. While, as mentioned above, the sleeve 34 forms a first valve member, the second valve member is formed by the rubber material 18 in the cup-shaped member 17, which rubber material or seal is continuously urged by the spring 19 against the lower end of the sleeve 34.

The operation of the valve is as follows: Assuming that all parts occupy the position shown in Figure 1, and that it is now desired to discharge material from the container 1 through the spout 24a, it is merely necessary to push the actuating member 22 downwardly. Downward movement of the actuating member 22 also causes the shaft 16 to move downwardly against the thrust of the spring 19 so that the seal 18 disengages the lower end of the sleeve 34. It will be clear that when the various elements are in this position, the gas pressure prevailing in the container 1 will cause the edible material such as whipping cream to pass as whipped-cream through the tube 14 and the tube 9 between the seal 18 and the lower end of the sleeve 34 into the passage 36 provided in the sleeve 34 and spaced from the adjacent portion of the shaft 16. From here, the material passes through the bore 33 and leaves the nozzle through the spout 24a. It should be noticed in this connection, that the bell-shaped portion 20 adjacent the seal 18 causes a kind of Venturi effect and provides for a smooth flow of the material from the wider tube 9 into the narrower passage 36. It will also be noticed that the material during its discharge, does not pass through any crevices or by any threads or other recesses where it might accumulate and deteriorate, thereby harmfully affecting the remainder of the contents.

As will also be clear from the above, the device is easy to disassemble and to clean. All that is necessary to disassemble the arrangement, is to unscrew the screw-top 5, whereupon the entire assembly on the lid 4 can be taken off. Then the nozzle is unscrewed, and after removal of the thimble 32, all elements can be taken out from the tube 9 for cleaning purposes and can easily be reassembled in the reverse order.

Referring now to the structure disclosed in Figure 2, a mere superficial comparison between this structure and the structure of Figure 1, will already indicate that the structure of Figure 2 is a further simplification over the device shown in Figure 1. Referring more particularly to the details of the structure shown in Figure 2, this structure comprises a tube 37 provided with a crimped portion 37a. This tube 37 takes the place of both the tubes 9 and 14 and also the insert 13 shown in Figure 1. The upper portion of the tube is braised to, or otherwise permanently connected to the lid 38 which substantially corresponds to the lid 4 of Figure 1. Furthermore, the upper portion of the tube 37 is provided with a thread 39 for engagement with a nut 40 having an outer cone-shaped portion 40a. Interposed between the lid 38 and the nut 40, is a gasket 41, which by tightening the nut 40, is securely pressed against the lid 38 and provides a sealing between the threaded area between the thread 39 on the tube 37 and the atmosphere. Frictionally mounted and secured to the cone-shaped portion 40a of the nut 40, is the neck portion 42a of the nozzle 42, which has a spout 42b.

The nozzle 42 has vulcanized therein, a sleeve 43 in which is reciprocably mounted an actuating member 44 provided with an upper flange 45 and a lower flange 46 similar to, and for the same purpose, as the actuating member 42 of Figure 1. The actuating member 44 engages the flange 47 of a shaft 48 which, similar to the shaft 16 of Figure 1, is provided with a bell-shaped portion 49. The bell-shaped portion 49 engages the sealing member 50 mounted in a cup-shaped member 51 sweated to, or otherwise rigidly connected to the shaft 48. The cup-shaped member 51, similar to the cup-shaped member 17 of Figure 1, is so shaped as to serve as seat for the upper end of the spring 52, the lower end of which rests on the crimped portion 37a. In contra-distinction to the spring 19 of Figure 1, however, the spring 52 is cone-shaped, having its wider end in engagement with the crimped portion 37a, while its smaller end engages the cup-shaped member 51.

The arrangement of Figure 2 is similar to that of Figure 1, provided with a sleeve 53 stationarily mounted in the upper portion of the tube 37 and provided with a gasket or sealing material 54. The sealing material 54 is preferably vulcanized to the sleeve 53 so that it forms a unit with the sleeve 53. However, while according to the arrangement of Figure 1, a separate member, namely the thimble 32, is provided for securely holding the sleeve 34 at its place, according to the arrangement of Figure 2, the nut 40 serves a double purpose, namely, to hold the gasket 41 securely in place while simultaneously with the interior surface 55, engaging the flange 56 of the sleeve 53 and holding it properly in place. It should be noticed that this double function is possible since the gasket 41 is of yieldable material, so that the proper pressure can be applied by the nut 40 against the flange 56 without interference by the seal 41.

The operation of the arrangement according to Figure 2, is very similar to that of Figure 1. Supposing that the structure of Figure 2 is properly mounted on a vessel containing the edible material to be dispensed, it is merely necessary for dispensing purposes, to press the actuating member 44 downwardly. This in turn causes downward movement of the shaft 48 so that the bell-shaped portion 49 spaces the sealing member 50 from the lower end of the sleeve 53 against the thrust of the spring 52. The gas pressure prevailing in the vessel will then cause the material to flow between the sealing member 51 and the lower end of the sleeve 53 by the bell-shaped portion 49 into the passage 57 of the sleeve 53. From here the material will pass through the bore 58 of the nut 40 and will be dispensed through the nozzle 40b. As soon as sufficient material has been dispensed, the pressure on the actuating member 44 is released, and the spring 52 automatically returns the sealing member 50 into engagement with the lower end of the sleeve 53, thereby again closing the valve composed of the two elements, namely, the sealing member 50 and the lower end of the sleeve 43.

It will be seen from the drawing, that also in this arrangement, no thread or crevices whatsoever come into engagement with the edible material being dispensed. As a matter of fact, there is only one single thread, namely, the thread 39 provided in the entire structure shown in Figure 2, and this thread 39 is on the outside of the upper portion of the tube 37. It will also be clear from the drawing, that the arrangement of Figure 2 comprises a minimum of parts, which materially contributes to the ease with which the arrangement can be cleaned. For this purpose, it is merely necessary to remove the lid 38 from the vessel, which lid is connected to the vessel in a manner similar to that described in connection with Figure 1. Thereupon, the nozzle 42 is slipped off the nut 40, and the nut 40 is unscrewed from the thread 39. When this has been effected, the shaft 48, together with the sleeve 53 and the other parts inside the tube 37, can be removed easily and individually for cleaning purposes.

When reassembling the structure, the tube 37 with the lid 38, which, as stated before, form a rigid unit, are again connected to the vessel, whereupon first the spring, then the sleeve 53, and finally the shaft 48, are lowered into the tube 37. Then the gasket 41 is assembled and the nut 40 is screwed onto the thread 39, thereby again properly positioning the sleeve 53. As a last step, it is now merely necessary to slide or slip the nozzle 42 upon the cone-shaped portion 40a of the nut 40.

While the invention has been described in connection with the specific arrangement shown in Figures 1 and 2, it is, of course, understood that the present invention is by no means limited to the particular construction shown in the drawings, but also comprises any modifications within the scope of the appended claims.

What I claim is:

1. In a valve for controlling the discharge of edible materials, tubular means provided with abutment means extending into the interior of said tubular means, shaft means reciprocably arranged in but spaced from the inner wall of said tubular means, cup-shaped means rigidly connected to said shaft means, sealing means mounted in said cup-shaped means and forming therewith a first valve element, means connected to said shaft means for engagement with said sealing means, a second valve element detachably mounted in said tubular means for cooperation with said first valve element, a threaded member having an opening therethrough receiving said shaft means threadedly engaging said tubular means and engaging said second valve element holding the same in position in said tubular means, and yielding means interposed between said abutment means and said first valve element for continuously urging said first valve element into engagement with said second valve element.

2. In a valve for controlling the discharge of edible materials, tubular means, abutment means associated with said tubular means and extending into the interior of said tubular means, shaft means reciprocably arranged in but spaced from the inner wall of said tubular means, a hollow cup-shaped member rigidly connected to said shaft means, sealing material mounted in said cup-shaped member and forming therewith a first valve element, a second valve element detachably mounted in said tubular means for cooperation with said first valve element, bell-shaped means engaging said sealing material and connected to said shaft means and positioned within said second valve element for securing a smooth flow of material passing by said first valve element and through said second valve element, a second valve element detachably mounted in said tubular means for co-operation with said first valve element, a threaded member having an opening therethrough receiving said shaft means threadedly engaging said tubular means and engaging said second valve element holding the same in position in said tubular means, and yielding means interposed between said abutment means and said valve element for continuously urging said first valve element into engagement with said second valve element.

3. In a valve for use in connection with the discharge of edible materials, tubular means provided with a threaded portion at the outside of one end thereof, nut means threadedly engaging said threaded portion and having a projection carrying a discharge spout rotatable thereon, said nut means being provided with a passage therethrough, shaft means reciprocably mounted in and extending through said passage and said tubular means but being spaced from the wall portions of said nut means and said tubular means, first valve element connected to said shaft means so as to be reciprocable therewith, second valve elements detachably mounted within said tubular means for co-operation with said first valve means, said nut means engaging said second valve element holding the same in position in said tubular means, abutment means associated with said tubular means, and spring means interposed between said abutment means and said first valve means for continuously urging said first valve means into contact with said second valve means to thereby close the valve formed by said first and second valve means.

4. In a valve for use in connection with the discharge of edible material, tubular means provided with an outer threaded portion on which is mounted a correspondingly threaded portion of a discharge nozzle for rotation thereon, said tubular means also being provided with an inner shoulder and an inner threaded portion, first valve element mounted upon said shoulder, threaded means provided with a passage therethrough threadedly engaging said inner threaded portion and engaging said first valve pressing said first valve element against said shoulder, shaft means extending through said passage into said tubular means while being spaced from the wall of said passage and the inner wall of said tubular means, said shaft means being reciprocable in said tubular means, abutment means connected with said tubular means, second valve element connected to said shaft means and reciprocable therewith, and yielding means interposed between said second valve element and said abutment means continuously urging said second valve element into engagement with said first valve element.

5. In a valve for use in connection with the discharge of edible materials, tubular means provided with a threaded portion at the outside of one end thereof and also provided with an inner threaded portion at the same end of said tubular means, sleeve means threadedly engaging the said outer threaded portion, nozzle means rotatably secured to said sleeve means, first valve element seated within said tubular means, gasket means interposed between said first valve element and said tubular means, screw means threadedly engaging said inner thread and engaging said first valve element stationarily securing said first valve element within said tubular means, said screw means having a passage therethrough, shaft means extending through said passage into said tubular means and reciprocable therein, second valve element connected to said shaft means for cooperation with said first valve element, abutment means within said tubular means, and yielding means interposed between said supporting means and said second valve element continuously urging the latter into engagement with said first valve elements.

6. In a valve for controlling the discharge of edible materials, tubular means having integral therewith abutment means extending into the interior of said tubular means, said tubular means also being provided with an outer threaded portion at one end thereof, screw means on said outer threaded portion and having a projection arranged to receive a discharge nozzle on said projection, said screw means being provided with a passage therethrough, first valve element clamped between said tubular means and said screw means and stationarily held in its position by the latter, said first valve element having a passage therethrough substantially in alignment with the passage in said screw means, shaft means extending through said passages into said tubular means and being reciprocable therein, second valve element on said shaft means and arranged for engagement with said first valve element, and yielding means interposed between said second valve element and said abutment means continuously urging said second valve element into closing engagement with said first valve element.

7. In a valve for controlling the discharge of edible materials, tubular means having abutment means extending into the interior of said tubular means, said tubular means also being provided with an outer threaded portion at one end thereof, screw means or said outer threaded portion and having a cone-shaped projection arranged to receive a discharge nozzle on said projection frictionally rotatable thereon, said screw means being provided with a passage therethrough, first valve element clamped between said tubular means and said screw means and stationarily held in its position by the latter, said first valve element having a passage therethrough substantially in alignment with the passage in said screw means, shaft means extending through said passages into said tubular means and being reciprocable therein, second valve element on said shaft means and arranged for engagement with said first valve element and spring means between said abutment means and said second valve element.

8. In a valve for use in connection with the discharge of edible materials, tubular means having an abutment shoulder between its ends extending into the interior of said tubular means, said tubular means being provided with a head having a thread on the outside thereof, said head also being provided with a smooth walled axial bore the terminus of which in the head forms a shoulder, sealing means engaging said shoulder, a first valve element resting on said sealing means, screw means threadedly engaging the threaded portion of said head and being provided with a passage through said screw means, the outer surface of said screw means forming a smooth walled projection arranged frictionally to engage and support a discharge nozzle on said projection, said screw means engaging said first valve element to clamp it with its cooperating sealing means against said shoulder, shaft means extending through said passage in spaced relation thereto and extending through said first valve element into said tubular means, second valve element secured to said shaft means and operatively cooperating with said first valve element, and spring means reciprocably supporting said shaft means and being interposed between said second valve element and said abutment shoulder.

9. In a valve for use in connection with the discharge of edible materials, tubular means having a skirt portion and a head portion, said skirt portion being provided with a shoulder extending into the interior of said tubular means and being integral therewith, said head portion being provided with a thread on the outside only, first valve element resting within said head portion in engagement therewith, clamping means threadedly engaging the thread of said head portion clamping said first valve element against said head portion, said clamping means being provided with an outer conical surface frictionally receiving and holding a discharge nozzle on said conical surface, shaft means extending through said clamping means and said first valve element into said skirt portion, second valve element connected to said shaft means operably cooperating with said first valve element, and yielding spring means interposed between said second valve element and said shoulder for reciprocably supporting said shaft means.

ALLYNE H. SMITH.

REFERENCES CITED

The following references are of record in the file of this patent:

UNITED STATES PATENTS

| Number | Name | Date |
|---|---|---|
| 614,465 | Habermann | Nov. 22, 1898 |
| 729,145 | Eckenwiler | May 26, 1903 |
| 2,270,063 | Linch | Jan. 13, 1942 |
| 2,281,604 | Smith | May 5, 1942 |
| 2,305,286 | Ward | Dec. 15, 1942 |
| 2,324,648 | Roeder | July 20, 1943 |